United States Patent [19]

Risi

[11] 3,990,316

[45] Nov. 9, 1976

[54] ROTATING DEVICE FOR SUPPORTING CONTAINERS IN LABELLING MACHINES

[76] Inventor: Roberto Risi, Via Zampieri, 11, Casalecchio di Reno, (Prov. Bologna), Italy

[22] Filed: Jan. 20, 1975

[21] Appl. No.: 542,736

[30] Foreign Application Priority Data

Jan. 22, 1974 Italy .................................. 3314/74

[52] U.S. Cl. .................................................. 74/24

[51] Int. Cl.² ......................................... F16H 27/04

[58] Field of Search ............... 74/55, 54, 22, 23, 24; 156/475, 486, 443

[56] References Cited

UNITED STATES PATENTS

| | | | |
|---|---|---|---|
| 349,775 | 9/1886 | Wood | 74/55 |
| 2,153,355 | 4/1939 | Von Hofe | 156/486 |
| 2,170,930 | 8/1939 | Paterson | 74/22 |
| 3,802,942 | 4/1974 | Aniberg et al. | 156/475 |

*Primary Examiner*—Samuel Scott
*Assistant Examiner*—Wesley S. Ratliff, Jr.
*Attorney, Agent, or Firm*—Guido Modiano; Albert Josif

[57] ABSTRACT

A rotating device for supporting containers in labelling machines which incorporate a plate rotating about a vertical axis, comprising at least one tubular body rotatably supported parallel to the axis of rotation of the device at the periphery of the plate and provided at its top with a cap for supporting the bottom of a container. A rod is rotatably guided in this tubular body and is provided at its top with means for peripherally retaining the container bottom, and an elastic member which urges this rod in the sense of bringing the retaining means beyond the container support plane on the cap. Furthermore a gear wheel is keyed on the tubular body and provided with elements angularly distributed on it and engaging with a stationary guide concentric with the axis of rotation of the device so as to keep the gear wheel fixed with respect to the plate, and a toothed sector arranged to engage with this gear wheel and concentrically rigid with the guide at the portion where the label is passed to the container.

6 Claims, 5 Drawing Figures

Fig. 3
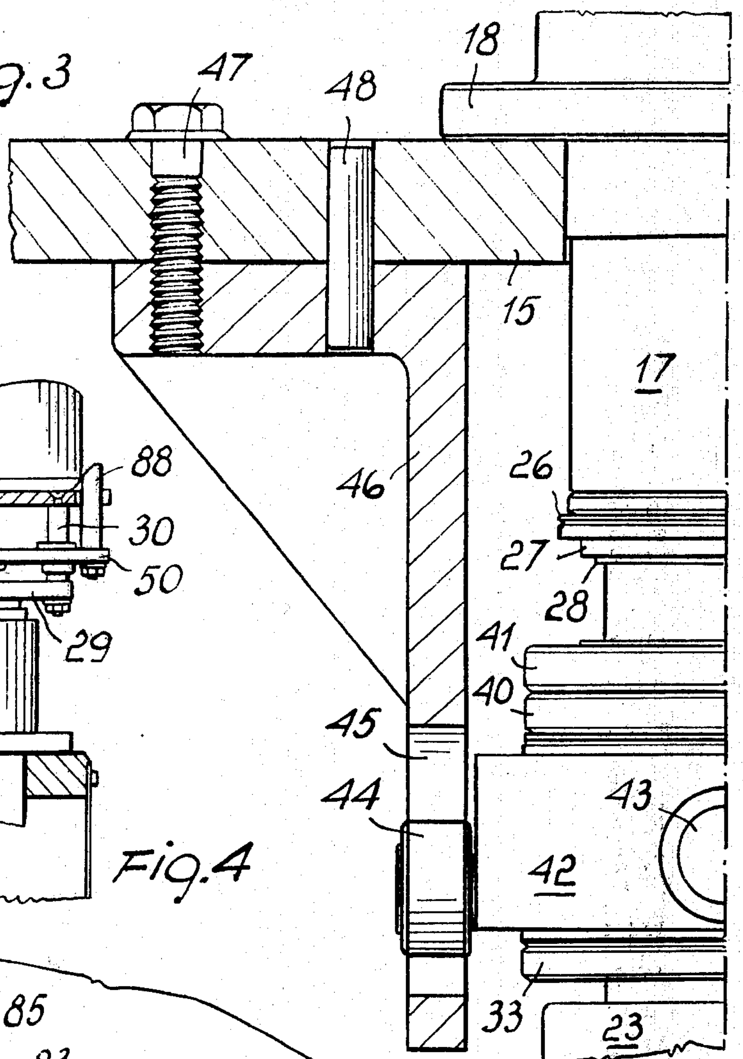
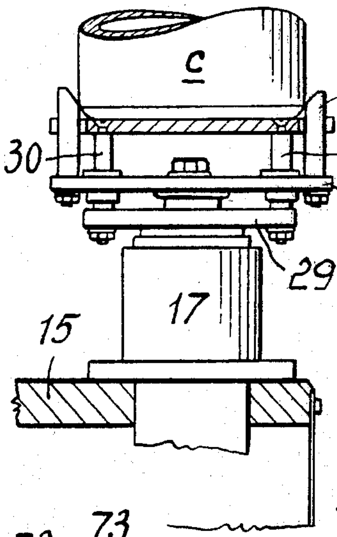
Fig. 4
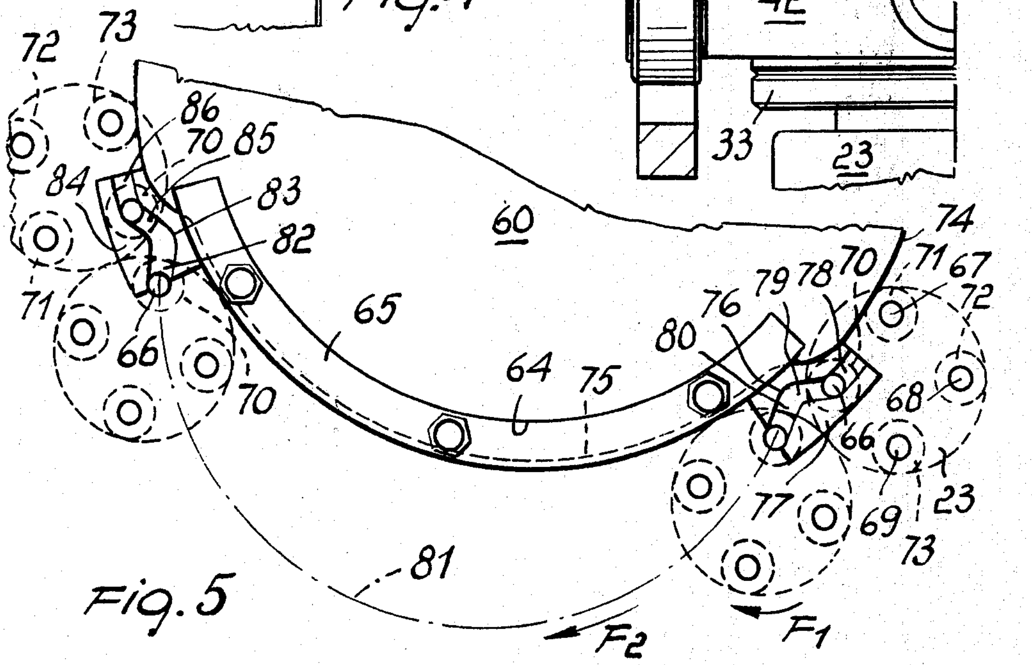
Fig. 5

ROTATING DEVICE FOR SUPPORTING CONTAINERS IN LABELLING MACHINES

BACKGROUND OF THE INVENTION

This invention relates to a rotating device for supporting containers in labelling machines.

In labelling machines, the containers on the outer surface of which the label is to be fixed are notably distributed at the periphery of a turntable and held in position between a rotating cap on which they rest and a presser which acts on the top of the container, so locking it against the cap.

In labelling machines of the aforementioned type, the disadvantage arises that once the cap on which the container rests is set into rotation to enable the label to be fixed, it tends to rotate beyond its scheduled angle or rotation because of inertia, and it may find itself angularly offset when about to receive the next container. Because of this the label may be fixed off-centre. Whereas this condition may not be significant when labelling cylindrical containers, it is unacceptable if the container is of irregular shape.

SUMMARY OF THE INVENTION

The object of the present invention is to provide a device for labelling machines which obviates the aforementioned disadvantage of off-centering of labels due to the inertia of rotation of the containers.

This object is attained by a rotating device for supporting containers in labelling machines which incorporate a plate rotating about a vertical axis, comprising at least one tubular body rotatably supported parallel to the axis of rotation of the device at the periphery of said plate and provided at its top with a cap for supporting the bottom of a container, a rod rotatably guided in said tubular body and provided at its top with means for peripherally retaining the container bottom, an elastic member arranged to urge said rod in the sense of bringing the retaining means beyond the container support plane on the cap, a gear wheel keyed on said tubular body and provided with elements angularly distributed on it and engaging with a stationary guide concentric with the axis of rotation of said device so as to keep the gear wheel fixed with respect to the plate, and a toothed sector arranged to engage with said gear wheel and concentrically rigid with said guide at the portion where the label passes to the container, there being further provided cam means for accelerating the gear wheel to an angular speed such that there is no relative movement between the gear wheel periphery and the toothed sector when these are in engagement, and cam means for braking the rotation of the gear wheel at the end of the toothed sector.

BRIEF DESCRIPTION OF THE DRAWINGS

Further characteristics will be more evident from the detailed description given hereinafter of a preferred embodiment illustrated, together with one modification, in the accompanying drawings in which:

FIG. 3 is a view on the line III —III of FIG. 1;

FIG. 4 is a modification of the device of FIG. 1, and

FIG. 5 is a view on the line V —V of FIG. 1.

DESCRIPTION OF THE PREFERRED EMBODIMENT

Figures 1, 2:
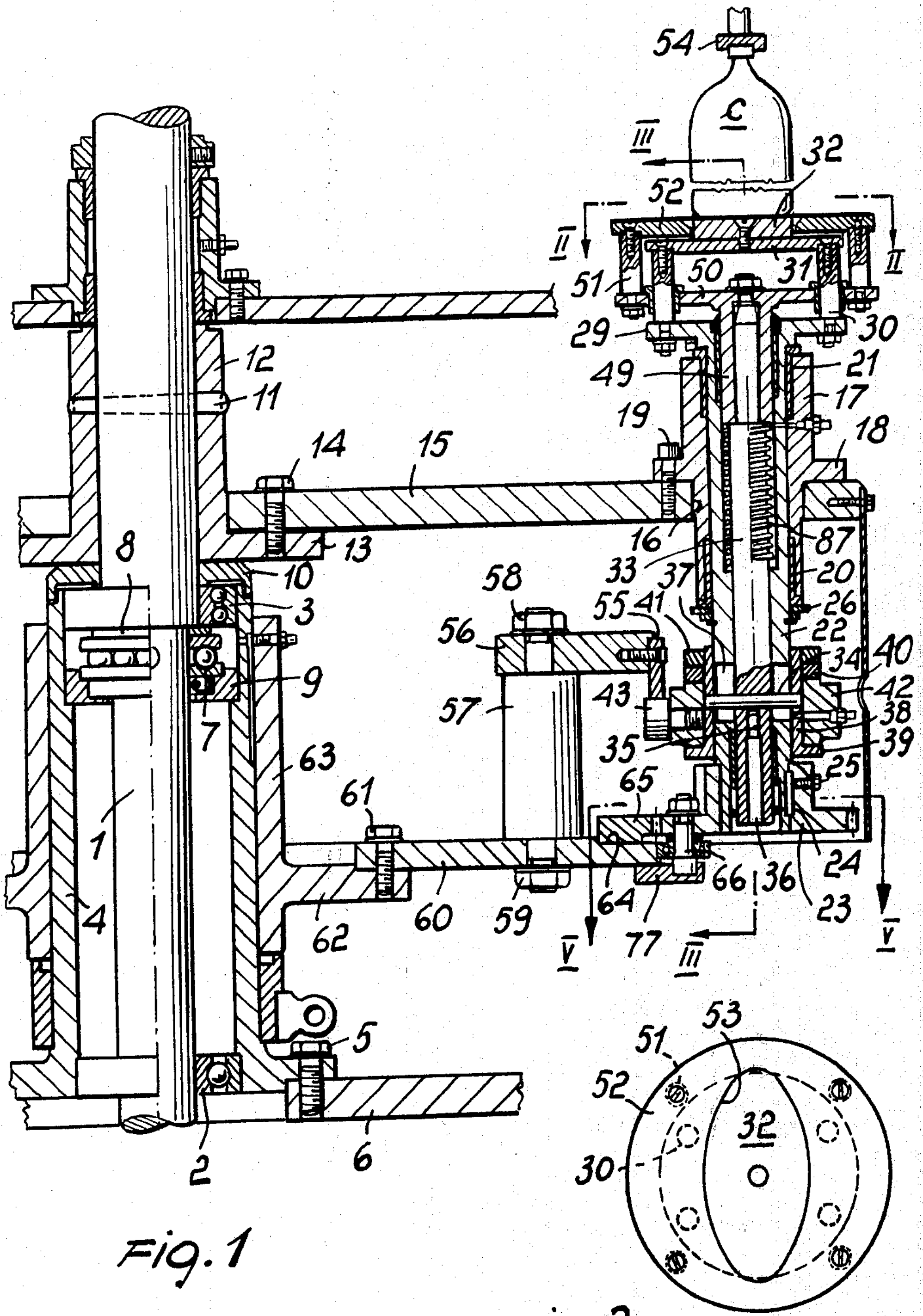
FIG. 1 is an elevational and sectional view of one half of the device according to the invention.
FIG. 2 is a view on the line II —II of FIG. 1.

With reference to the stated figures, in which the same elements or parts are indicated by the same reference numerals, the device according to the invention comprises a vertical shaft 1 driven with continuous motion by a drive member, not shown in the drawing. The shaft 1 is supported by the bearings 2, 3 housed in seats in a flanged sleeve 4 fixed vertically by bolts 5 on a base 6.

The axial thrusts on the shaft 1 are discharged to the base by a thrust bearing 7, one ring of which rests on a shoulder of the sleeve 1 by way of a spacer 8, and the other ring rests on an internal shoulder of the sleeve 4 by way of a thrust bearing 9.

The sleeve 4 is closed upperly by a cap 10. A sleeve 12 comprising a flange 13 is fixed rigidly on that part of the shaft which projects beyond the cap 10 by means of a pin 11. A circular plte 15 is centered on the sleeve 12 and fixed to it by bolts 14, and its periphery comprises angularly distributed holes 16.

In the holes 16 is inserted a bush 17 provided with a coller 18 fixed on the plate 15 by screws 19.

A tubular body 22 is rotatably supported inside the bush 18 by smooth bearings 20, 21, and to its lower end is keyed a gear wheel 23 which is rendered rotatably rigid with the body 22 by a key 24 and is fixed axially by a dowel 25.

The tubular body 22 is prevented from sliding upwards by a thrust bearing 26 which rests on the spacer 27 supported by an elastic ring 28 (see also FIG. 3) housed in an annular groove on the body 22.

The top of the body 22 comprises a radial enlargement 29 on which four cylindrical columns 30 supporting a circular cap 31 are fixed in positions corresponding to the vertices of a rectangle (FIG. 2). This cap forms the support for the containers on whose outer surface the label is to be fixed.

If these containers have an elliptical base, a projecting piece 32 corresponding to the shape of said base is advantageously fixed on the cap 31.

A cylindrical rod 33 traversed lowerly by a diametrical gudgeon pin 34 is slidably guided inside the tubular body 22. The gudgeon pin 34 is fixed in position by a dowel 35 inserted through an axial hole 36 and emerging through longitudinal slots 37 in diametrically opposing positions in the tubular body 22.

The opposing ends of the gudgeon pin 34 are engaged in a bush 38 slidably guided on the tubular body 22.

The bush 38 comprises lowerly a collar 39, while its upper portion is threaded to receive a nut 40 with its relative locking nut 41. The nut 40 and collar 39 form an annular cavity in which a ring 42 is rotatably disposed and supports two idle rollers 43, 44 mutually offset by 90°. The roller 44 is guided in a vertical slot 45 in a bracket 46 fixed by a bolt 47 and pin 48 to the lower face of the plate 15 (FIG. 3).

To the top of the rod 33 is fixed a sleeve 49 comprising a flange 50, on the periphery of which are fixed four columns 51 in positions corresponding to the vertices of a square and which carry a disc 52, this flange being traversed by the columns 30 more towards its centre. The disc 52 comprises an elliptical aperture 53 (see FIG. 2) with slightly flared eges and arranged to mate perfectly with the projecting portion 32. As will be more evident from the description of operation, the disc 32 is made to rise with respect to the cap 31 in such a manner that when a container C is deposited on the projection 32, the edges of the aperture 53 embrace the bottom of the container to retain it firmly in co-operation with presser means 54 which act on the container top.

The control impulse for raising the disc 52 and rod 33 is transmitted by a stationary cam 55 which extends circumferentially about the shaft 1 and on which the roller 43 rolls during rotation of the plate 15. The cam 55 is fixed to a bracket 56 mounted at the top of a column 57 and held there by a nut 58 screwed on to a threaded shank which traverses the bracket. The column 57 is fixed by a nut 59 on a plate 60 of substantially circular crown shape concentric to the shaft 1.

The plate 60 is centered and fixed by bolts 61 on a flange 62 of a sleeve 63 mounted on the sleeve 4 and rigid in rotation with this latter. On the periphery of the plate 60 there is a seat 64 for a toothed sector 65 which extends concentrically about the shaft 1 at a distance from it such as to tangentially engage with the gear wheel 23.

The length of the toothed sector 65 is such as to make the gear wheel 23 turn through a predetermined angle from the point at which it engages with the toothed sector 65, this angle depending upon extent of rotation to be given to the container. With reference to FIG. 5, in the example illustrated the length of the toothed sector 65 has been chosen so as to make the gear wheel 23 rotate substantially through one revolution.

In FIG. 1, the toothed sector 65 and cam 55 are shown lying in the same sectional plane, while in reality the cam 55 is upstream of the toothed sector at the station where the containers are fed to the cap 32. Four pins 66, 67, 68, 69 (FIG. 5), disposed at the vertices of a square, are mounted on the gear wheel 23 in order to keep the position of the caps 31, 52 constant with respect to the shaft 1, i.e. to prevent the tubular body 22 rotating about itself during rotation of the plate 15. The pins 66 -69 support relative idle rollers 70, 71, 72, 73 and project a certain distance below these latter. The rollers 70 -73 engage in pairs with the outer profile 74 of the plate 60, which constitutes a guide perfectly concentric to the shaft 1, and roll on this profile. In this manner the wheel 23 remains fixed with respect to the plate 60 over the entire perimeter 74 with the exception of the portion corresponding to the toothed sector 65, along which the plate 60 comprises a corresponding peripheral recess 75 to allow rotation of the gear wheel 23. To avoid a too violent impact occurring when the gear wheel 33 comes into contact with the toothed sector 65, and which could cause rapid deterioration of the teeth, a cam 76 is provided which progressively brings the peripheral speed of the gear wheel 23 in the direction of the arrow F1 to a value equal to that of the translation about the shaft 1 in the direction of the arrow F2. For this purpose the cam 76 consists of a groove formed in a block 77 fixed lowerly to the plate 60. The groove 76 comprises an initial entry portion 78 for the pin 66 of the first roller 70 of the pair of rollers 70, 71 which roll on the peripheral profile of the plate 60. Once the pin 66 has penetrated into the portion 78, it is deviated towards a second portion 79 so that the gear wheel 23 undergoes an acceleration which enables it to engage with the toothed sector 65 without any impact taking place. The third portion 80 of the cam acts only as an accompaniment, as engagement between the gear wheel and toothed sector has already taken place.

When the pin 66 travels through the portion 79, the roller 70 abandons the profile 74 and can penetrate into the recess 75. After the pin 66 leaves the groove 80, it describes the trajectory 81 until it engages with the portion 82 of a cam 83 specular to the previous cam 76 and formed in a block 84 rigid with the plate 60 at the end of the toothed sector 65.

The portion 82 is followed by a second portion 85 which terminates in a third exit portion 86 concentric with the shaft 1. The purpose of the cam 83 is to prevent the roller 73 colliding with the profile 74 of the plate 60 at the end of the toothed sector 65 because of the inertia of the gear wheel 23.

It can be seen that the cam 76, the trajectory 81 and cam 83 describe a cycloid path.

The operation of the described device is as follows.

If the plate 15 is rotating regularly with continuous motion, the roller 43 comes into contact with the cam 55 at the feed station for the containers and is urged downwards together with the ring 42 on which it is mounted, and which is rotatably intercepted by the roller 44 which can slide only vertically in the slot 45 of the bracket 46. During this stage the tubular body 22 is prevented from rotating by engagement with a pair of rollers, for instance those bearing the reference numerals 70, 71, on the profile 74. When the ring 42 is lowered, the bush 38 is also lowered and entrains the pin 34 and rod 33 downwards against the return action of a helical cylindrical spring 87 housed in a cavity between the inner wall of the tubular body 22 and outer wall of the rod 33, and which has one end resting on the sleeve 49 and the other end on the shoulder of the inner wall of the tubular body 22.

The extent of lowering of the rod 33 is such that the upper surface of the disc 52 becomes coplanar with that of the projection 32. At this point, before the roller 43 leaves the stationary cam 55, a container C with an elliptical base is transferred on to the projection 32. As rotation of the plate 15 continues, the roller 43 leaves the cam 54, because of which the disc 52 rises under the action of the spring 87 so as to laterally retain the base of the container C while simultaneously the presser 55 is lowered on to the end of the container so as to lock it into position. When the plate 15 has travelled through a certain angle, the container C arrives at the labelling station at which a label is transferred onto its outer surface. The label is applied by first bringing a vertical edge of the label into contact with the container and then rotating this latter through a sufficient angle for the entire label to adhere to its surface. Rotation of the container begins when the pin 66 (see FIG. 5), having travelled through the initial portion of the groove 78, enters the portion 79 along which the gear wheel 23 undergoes acceleration which brings it into engagement with the toothed sector 65 without impact. At the end of the toothed sector 65, the gear wheel 23 and with it the tubular body 22, the rod 33 and container C, have made a rotation of approximately 360° which has enabled the label to wrap itself around the container and adhere to it. At the end of the toothed sector 65, the pin 66 passing from the portion 85 to the portion 86 of the cam 83 stops the gear wheel 23 which conserves its position with respect to the plate 15 because of the guide effect of the rollers 70, 73 which roll on the profile 74. In this manner the roller is prevented from becoming unduly thrust and colliding against the profile 74 because of the inertia of rotation, so becoming damaged or damaging the profile itself.

The aforementioned stages are repeated each time a container arrives at the toothed sector 65 during the rotation of the device. When the pin 66 has left the portion 86 of the cam 83, the container C is removed. This is accomplished by providing a further fixed cam, not shown on the drawing, but operating in a manner analogous to the cam 55. This cam acts on the ring 42 and lowers the disc 52 to the level of the projection 32. At the same time the presser 54 is raised from the top of the container, which can thus be transferred to a discharge conveyor.

The invention is susceptible to numerous modifications all of which fall within the scope of the inventive idea. For example, instead of providing a disc 52 shaped according to the bottom section of the container, a number of columns 88 can be mounted on the flange 50 with their ends movable between a position in which they lie below the cap 50 and a position in which they project above it, so as to form a type of lateral shoulder for the container. This arrangement allows the support to be more easily adapted to the bottom section of the container. The columns 88 may also be fixed at suitable points on the cap 50.

I claim:

1. A rotating device for supporting containers in labelling machines which incorporate a plate rotating about a vertical axis, comprising at least one tubular body rotatably supported parallel to the axis of rotation of the device at the periphery of said plate and provided at its top with a cap for supporting the bottom of a container, a rod rotatably guided in said tubular body and provided at its top with means, for peripherally retaining the container bottom, an elastic member arranged to urge said rod in the sense of bringing the retaining means beyond the container support plane on the cap, a gear wheel keyed on said tubular body and provided with elements angularly distributed on it and engaging with a stationary guide concentric with the axis of rotation of said device so as to keep the gear wheel fixed with respect to the plate, and a toothed sector arranged to engage with said gear wheel and concentrically rigid with said guide at the portion where the label passes to the container, there being further provided cam means for accelerating the gear wheel to a speed such that there is no relative movement between the gear wheel periphery and the toothed sector when these are in engagement, and cam means for braking the rotation of the gear wheel at the end of the toothed sector.

2. A device as claimed in claim 1, wherein said means for peripherally retaining the container bottom comprise a disc in which there is an aperture in the shape of the container, said rod being controlled between a position in which the upper surface of said disc is coplanar with a projecting portion complementary with said aperture and rigid with the cap fixed to the top of the tubular body, and a position in which said disc is above said projecting portion for retaining the container base.

3. A device as claimed in claim 1, wherein means are provided for controlling said rod consisting of a gudgeon pin which diametrically traverses the rod and whose ends project beyond the outer periphery of the tubular body through a pair of longitudinal opposing slots, and a bush rotatably rigid with the end of said gudgeon pin and slidable on said tubular body, said bush defining an annular seat for a ring on which two rollers are projectingly mounted, one of which is designed to engage a fixed cam extending concentrically to the axis of rotation of the device for raising and lowering said rod, while the other roller is guided in a vertical slot formed in a bracket rigid with said plate.

4. A device as claimed in claim 1, wherein said elements angularly distributed over the gear wheel consist of pairs of rollers which ar diametrically opposed with respect to the axis of rotation of the tubular body, two adjacent rollers engaging the peripheral profile of a plate which extends concentrically to the axis of rotation of the device, the rollers being also provided with coaxial projections arranged to engage a cam on a stationary block for accelerating the speed of rotation of the gear wheel to a speed equal but of opposite sign to that of its speed of translation.

5. A device as claimed in claim 4, wherein a cam formed in a further stationary block is provided at the exit of the toothed sector and shaped in such a manner as to brake the rotation of the gear wheel so that it becomes fixed with respect to the axis of rotation of the device, a pair of rollers which engage with the profile of said stationary plate being mounted on it.

6. A device as claimed in claim 1, wherein a plurality of columns is disposed at the top of said rod, their ends being mobile between a position in which they lie below the support cap for the container rigid with the tubular body, and a position in which they project above said cap so as to form a type of lateral shoulder for the container.

* * * * *